US005753020A

United States Patent [19]

Minuto

[11] Patent Number: 5,753,020

[45] Date of Patent: May 19, 1998

[54] IMAGE TRANSFER MEDIUM

[76] Inventor: Maurice Gregory Minuto, 10 Mark Dr., Smithtown, N.Y. 11788

[21] Appl. No.: 871,225

[22] Filed: Jun. 9, 1997

[51] Int. Cl.[6] .................................................. C09D 5/00

[52] U.S. Cl. .................................................. 106/287.26

[58] Field of Search .................................................. 106/287.26

[56] References Cited

U.S. PATENT DOCUMENTS 3,350,344 10/1967 Bears .................................................. 524/860

3,661,790 5/1972 Dean et al. .................................................. 252/301.36

4,264,369 4/1981 Minuto .................................................. 106/184.3

*Primary Examiner*—David Brunsman

[57] ABSTRACT

The image transfer medium of this invention is a generally viscous or semi-viscous fluid comprising water, an alkylene glycol, preferably 1,3-butylene glycol, 2-ethyl 1,3-hexane diol and a preservative.

2 Claims, No Drawings

IMAGE TRANSFER MEDIUM

FIELD OF THE INVENTION

This invention relates to an image transfer medium and is particularly related to a novel composition in the form of a viscous or semi-viscous fluid for use in transferring prints or images from one surface to another.

BACKGROUND OF THE INVENTION

Silicone putty-like substances have been widely marked by the toy industry. Due to their elasticity, non-toxicity and other desirable attributes, these silicone substances, which are commonly referred to as "silly-putty" or "bouncing putty" are used largely by children to bounce it, stretch it, form it into various shapes and press it against printed matter to transfer the print (e.g., cartoons and other pictorial illustrations) onto the surface of the putty. Examples of such putty-like substances are described in U.S. Pat. No. 3,350,344 issued to Melvin D. Beers on Oct. 31, 1967 and U.S. Pat. No. 3,661,790 issued to Dean et al. on May 9, 1972. In addition to their bouncing ability, some bouncing putties also exhibit the ability to glow in the dark after exposure to a light source.

While most of the presently marketed bouncing putties can be used to transfer images and prints onto its surface when pressed against the printed matter, these images cannot be transferred to another sheet or surface since the silicone putty does not release the ink from its surface.

As described in U.S. Pat. No. 4,264,369 issued on Apr. 28, 1981, image transfer may be facilitated by first spreading and rubbing onto a transfer sheet or surface a fluid medium as therein described, and then pressing the putty thereon with its image-bearing surface firmly against the transfer sheet or surface. The fluid transfer medium described in that patent consists of the following ingredients, wherein all parts are by weight:

(1) water;

(2) from about 1 to about 3 parts of a thickening agent per 100 parts of water, wherein the thickening agent is hydroxyethyl cellulose or carboxymethyl cellulose (CMC), although hydroxyethyl cellulose is preferred;

(3) from about 2 to about 10 parts of a mixture per 100 parts of water, wherein said mixture consists of the following ingredients:

(a) from about 70 to about 80 weight percent sulfonamide having the general formula:

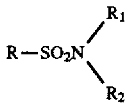

wherein R is an alkyl, aryl, alkaryl or aralkyl radical in which the alkyl moiety contains 1 to 4 carbon atoms; $R_1$ and $R_2$ each is hydrogen or an alkyl radical having 1 to 8 and preferably 1 to 3 carbon atoms, or it is a cyclohexyl radical, e.g., cyclohexane, and wherein $R_1$ and $R_2$ may be the same or different moieties.

(b) from about 15 to about 25 weight percent of a water-insoluble alkylene glycol having 5 to 8 carbon atoms, and (c) from about 5 to about 10 weight percent of an ester produced by the reaction of alkylene glycol with a dicarboxylic acid.

As it is further disclosed in that patent, in lieu of the glycols mentioned as component (b), or in admixture therewith, one can use 2-ethyl 1,3 hexanediol.

The fluid transfer medium of the present invention constitutes further improvement with respect to the fluid transfer media described in said U.S. Pat. No. 4,264,369 in that it has been found that not all of the ingredients mentioned therein are necessary in preparing an effective image transfer composition.

Therefore, it is an object of this invention to provide a fluid medium for transferring prints and images from one surface to another by using bouncing putties.

It is a further object of this invention to provide a novel composition in the form of a viscous or semi-viscous fluid which, when rubbed onto a surface such as the human skin or onto a sheet of paper, permits images imprinted on silicone putty to be transferred on such sheets or surfaces.

It is also an object of this invention to provide such image transfer fluid medium which is non-toxic, non-irritating and free from adverse or harmful effects for use by children with silly putties for the aforementioned purposes.

SUMMARY OF THE INVENTION

Images printed on putty-like substances such as silicone putty may be transferred onto another surface (e.g., a sheet of paper or the human skin) using an image transfer medium. The image transfer medium of this invention is a generally viscous or semi-viscous fluid comprising water, an alkylene glycol, preferably 1,3-butylene glycol, 2-ethyl 1,3-hexane diol and a preservative. The putty-like substance is first pressed against the printed matter to form an image on the surface of the putty. The image transfer medium is then rubbed onto a sheet of paper, or a human skin. Next, the putty-like substance is pressed firmly against the paper or the skin to transfer a clear image of the printed matter which will be imprinted on the paper or the skin.

DETAILED DESCRIPTION OF THE INVENTION

The novel and improved image transfer medium of the present invention basically consists of the following ingredients, wherein all parts are by weight:

(a) from about 50 to about 360 parts of water, (b) from about 0 to about 100 parts of alkylene glycol, (c) from about 5 to about 300 parts of 2-ethyl 1,3 hexanediol, and (d) from about 1.0 to about 2.1 parts of a preservative as hereinafter described.

The alkyl glycol used as ingredient (b) is preferably butylene glycol but may be another glycol such as ethylene, glycol or propylene glycol used alone or admixture with one another, or with the butylene glycol.

Ingredient (c) is preferably 2-ethyl 1,3-hexanediol alone. However, other diols may, if desired, be added or used in admixture with 2-ethyl 1,3-hexandiol.

The image transfer composition of the present invention contains a preservative in order to prevent microbiological growth in the composition. One effective preservative is Germaben II E, a product of Sutton Laboratories, Chathem, N.J. This compound consists of about 60% propylene glycol, about 20% Germall II (Diazolidinyl Urea) about 10% Methylparben and about 10% propylparben, wherein all percentages are by weight.

Other preservatives may be used in lieu of, or in admixture with Germaben II E provided that such other preservatives are compatible with the ingredients of the image transfer composition.

In one typical formulation 360 parts by weight of water was added to a laboratory blender followed by the addition of 100 parts of 1,3 butylene glycol, 20 parts of 2-ethyl 1,3-hexanediol and 2.1 parts of Germaben II E, and the mixture was agitated for approximately 10 minutes. The resulting mixture was colorless and semi-viscous, having the consistency of maple syrup.

The foregoing ingredients were mixed at ambient conditions in the aforementioned order. However, the order of addition of the ingredients is not, per se, critical in preparing the formulation.

The amount of each ingredient used in the image transfer composition of this invention may vary from that which is indicated in the illustrative formulation. Thus, the amount of water may vary from about 50 to about 360 parts; the amount of 1,3 butylene glycol may vary from about 0 to about 100 parts; the amount of 2-ethyl 1,3-hexanediol may vary from about 5 to about 300 parts and the amount of the preservative may vary from about 1 to about 2 parts, all parts being on weight basis.

The foregoing ingredients were mixed at ambient conditions until a homogeneous fluid was obtained which, typically, had the consistency of maple syrup.

The image transfer fluid made according to this invention may be applied to a sheet of paper or to the human skin by dipping a piece of cloth or an applicator swab therein and then spreading and rubbing it onto such surfaces. It is non-toxic, non-irritating and has no discernible harmful effect.

In a typical application, a portion of an image transfer fluid made as aforesaid was applied to a sheet of paper while another portion was applied by rubbing it onto the forearm of a human body. A commercially available bouncing putty was pressed against a printed matter for few seconds thereby forming an image of the prints on the putty surface. When the putty was pressed against the sheet of paper and the forearm, a clear image of the printed matter was imprinted on both surfaces.

What is claimed is:

1. An image transfer medium for reproducing printed matter from one surface onto another surface, said image transfer medium comprising from about 50 to about 360 parts of water, from about 0 to about 100 parts of alkylene glycol having 2 to about 4 carbon atoms, from about 5 to about 300 parts of 2-ethyl 1,3-hexanediol, and from about 1 to about 2 parts of a preservative for said medium, all parts being on weight basis.

2. An image transfer medium as in claim 1 wherein said alkylene glycol is 1,3-butylene glycol.

* * * * *